United States Patent Office 3,340,436
Patented Sept. 5, 1967

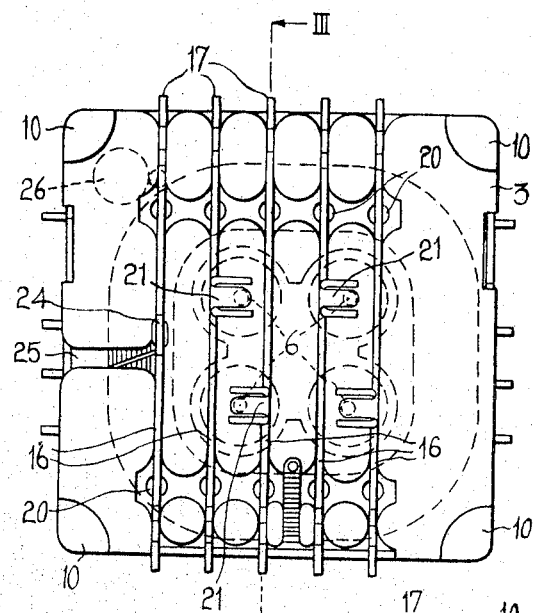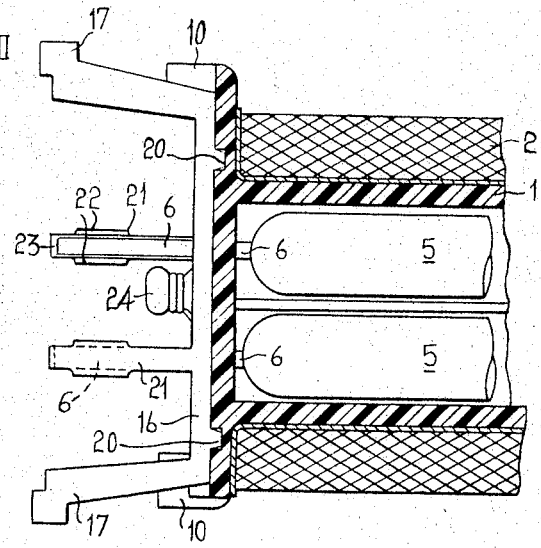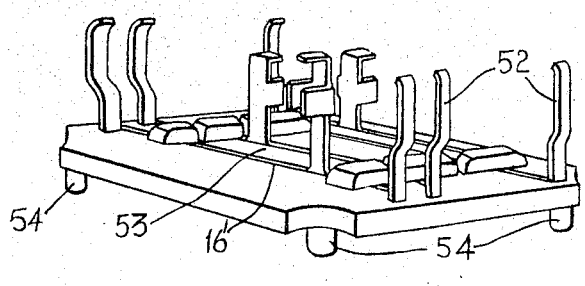

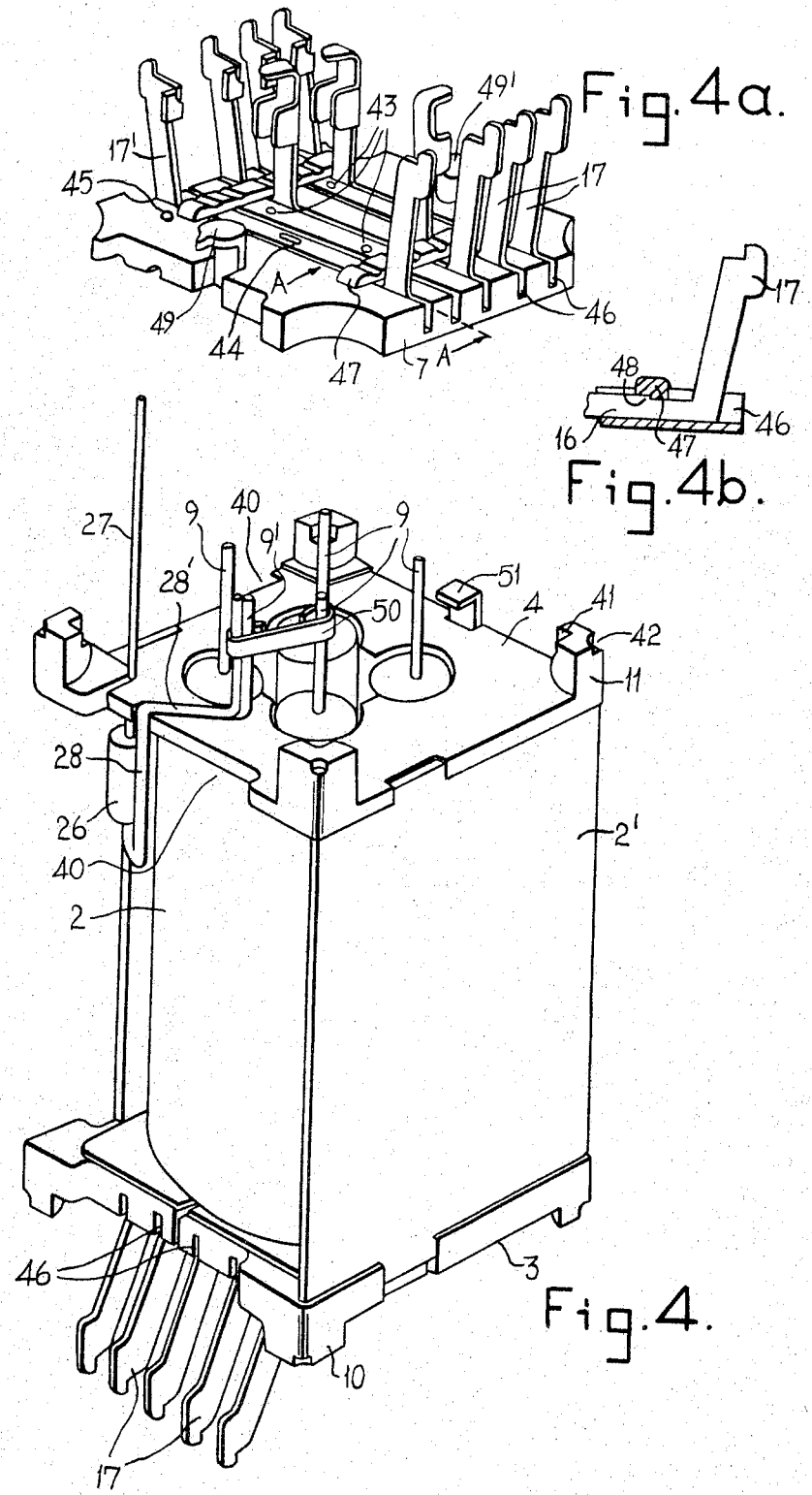

3,340,436
ELECTRICAL COMPONENT MODULES
Raymond Dennis Jones, Cheam, and Albert Edward Carter, Bexleyheath, England, assignors to Associated Electrical Industries Limited, London, England, a British company
Filed Mar. 19, 1965, Ser. No. 441,218
Claims priority, application Great Britain, Mar. 24, 1964, 12,396/64
9 Claims. (Cl. 317—101)

This invention relates to electrical circuit modules, by which is meant unitary assemblies of electric circuit elements which can be built up into an overall circuit organization of modular form. The circuit elements and any interconnections thereof within the module are not necessarily the same for all modules, and in some modules the circuit elements may consist exclusively of conductors.

In commonly assigned copending application Ser. No. 359,345 filed Apr. 13, 1964, now Patent No. 3,302,068 there is claimed an electrical circuit module having an end face formed by an end-cheek, end-plate or the like through which extend terminal members from the circuit elements of the module and by which are carried conductors extending from positions of connection with said terminal members to positions adjacent opposite edges of the end face, at which latter positions the conductors have tag portions extending outwardly of the end face in a direction transverse thereto. A number of such modules can be assembled side-by-side with tag portions at adjacent edges of their end faces lying in juxtaposed relationship so that they can be connected electrically together, for example by soldering. In this way the conductors can be interconnected to form connecting multiples extending across the assembly between the extreme outer edges thereof.

In the various embodiments described in the said copending application the conductors which extend towards the edges of the module end face from the terminal members are located behind this end face and are formed with loops which, by projecting through the terminal apertures in the end-cheek or plate, embrace the projecting terminal members socket-wise and can be connected to them, again for example by soldering.

According to the present invention the conductors extend externally across the end face, which for this purpose is formed with transverse slots for receiving and locating the conductors. Preferably also the conductors are no longer formed with loops where they are to be connected to the projecting terminal member but instead have upstanding portions formed with connecting tabs which embrace opposite sides of a projecting terminal member extending alongside this upstanding portion. The conductors are conveniently of flat form received edgewise in the end face slots, in which event their tag portions may be constituted by end portions projecting transversely of the slot-contained portions in planes either parallel or normal to the slot-contained portions.

In the accompanying drawings various embodiments of the invention as applied to a reed relay module suitable for use as a cross-point relay in a co-ordinate switching system are illustrated by way of example:

FIG. 2 is an end view of the same module from the end opposite to that seen in FIG. 1;

FIG. 3 is a side sectional view taken along line III—III in FIG. 2;

FIGS. 4 and 4a illustrate a modified form of the module;

Figure 1:
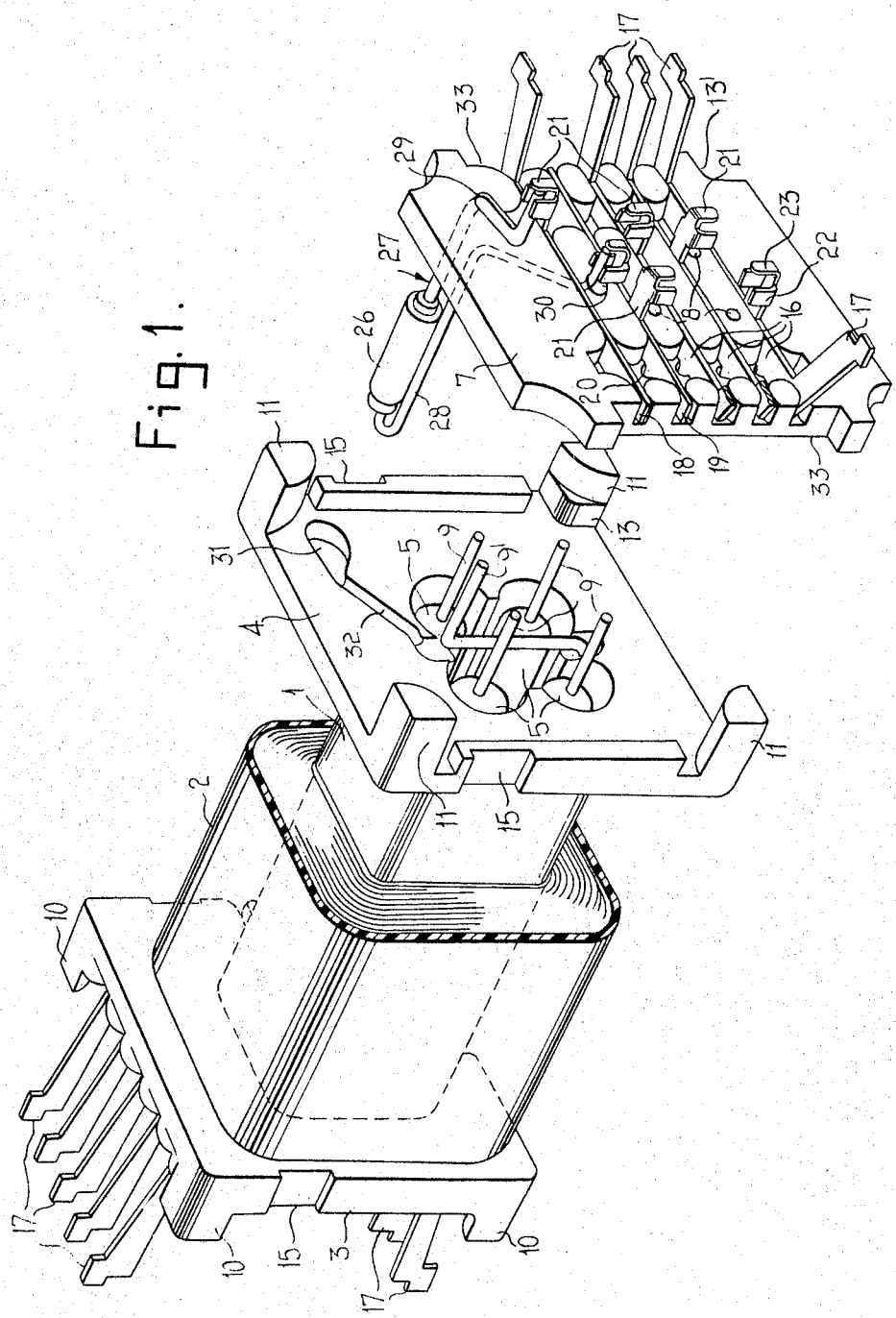
FIG. 1 is an exploded pictorial view of one form of such module.

FIG. 4b being a fragmentary sectional view on the line A—A of FIG. 4a; and

FIG. 5 illustrates a modified form of end plate and tag-forming conductors.

Referring first to FIGS. 1–3, a bobbin 1 carrying an operating winding 2 between end cheeks 3 and 4 is formed with a hollow interior of clover-leaf cross-section in which four sealed reed contact units 5 are accommodated. At the end cheek 3 the interior of the bobbin 1 is closed except for holes through which pass terminal members 6 projecting from the contact units 5 at that end. At the end cheek 4 the interior of the bobbin is open to permit insertion and removal of the contact units 5. An end plate 7 fits onto the end cheek 4 and has holes 8 through which pass terminal members 9 projecting from the contact units 5 at this end. The end cheeks 3 and 4 have quadrantal corner projections 10 and 11. These enable a matrix of similar modules to be assembled side-by-side: at the centre of each "square" of four modules the conjunction of the four quadrantal projections at the adjacent corners of these modules forms a complete circle which can be embraced by a circular clip to hold the modules together. The end plate 7 has corner cut-outs so as to locate between the quadrantal projections 11 of the end cheek 4, these projections 11 being longer than the projections 10 at the other end so that they will project forwardly of the face of the end plate 7 when the latter is in position. The root of one of the projections 11 and the cut-out at the corresponding corner of the end plate 7 are given a distinctive shape as shown at 13, 13' so as to ensure proper orientation of the end plate. Cut-outs 15 on the edges of the end cheeks 3 and 4 are provided for engaging locating lugs on a U-shaped screening plate (not shown) which can be applied over the winding 2 on three sides thereof: the fourth side will be screened by the corresponding screening plate of an adjacent module on that side.

The outer faces of the end cheek 3 and end plate 7 are so formed as each to define a number of parallel slots in which are carried transversely extending yoke portions of conductors 16 formed with upstanding connection tag portions 17 adjacent opposite edges of the end cheek or plate as the case may be. As best seen in FIG. 3 these tag portions 17 on each conductor 16 are somewhat outwardly inclined so that towards their distal ends they overhang the edges. Consequently when two similar modules are placed side-by-side adjacent tag portions of their conductors 16 at one end will overlap (the conductors themselves being in general alignment) and can therefore be connected together as by soldering. In this way multiple connections constituted by the connected aligned conductors can be formed across the end faces of the modules. The conductors 16 carried by the end cheek 3 are shown disposed at right angles to those carried by the end plate 7; consequently with a number of similar modules arranged in a rectangular matrix, with aligned conductors 16 connected together as just described, multiples extending in two co-ordinate directions will be formed, with each module positioned to constitute a cross-point relay. If desired however, the end plate 7 could be designed for application to the end cheek 4 with the conductors 16 disposed parallel to those on the end cheek 3.

Depending on the connections required to the contacts in the units 5, some end face conductors may be provided which have only one tag portion 17 (such as conductor 18) or which have no such tag portion (for example conductor 19). The conductors 16, 18 and 19 are located laterally by means of projecting tabs 20 locating holes in the end faces of the end cheek 3 or end plate 7 as the case may be.

The projecting terminal members 6 and 9 from the contact units 5 project alongside upstanding connecting portions 21 on respective conductors 16; one of the projecting terminal members 9 projects alongside such a connecting portion 21 on the conductor 18. Each of these connecting portions 21 is formed with two tabs 22 which embrace opposite sides of the adjacent terminal member 9 and can therefore be connected to it as by soldering. Lips 23 formed at the outer ends of the connecting parts 21 locate the contact units 5 longitudinally within the bobbin 1 by abutting from the outer ends of the terminal members 9.

One of the conductors 16 carried by the end cheek 3, instead of having a connecting portion such as 21, has a flat bollard 24 to which one end of the coil 2, brought out through a slot 25 in the end cheek 3, is connected. The other end of the coil 2 is connected to a terminal member 9′ which extends from one end to the other and projects out through both of the end cheeks 3 and 4. Again depending on the connections required, a rectifier 26 can be carried behind the end plate 7 by means of its connecting leads 27 and 28. Lead 27, extending through the end plate 7 and along a groove 29 in the face of this end plate, projects alongside the connecting portion 21 on conductor 18 for connection thereto. Lead 28 extends to and across the rear of end plate 7 to project alongside the terminal member 9′, where it projects through the end cheek 4, being connected thereto and to the conductor 19 (and thereby also to one of the contact units 5) by means of a second connecting portion 30 on this latter conductor. On applying the end plate 7 to the end cheek 4 the rectifier 26 and its leads 27 and 28 pass through an opening 31 in the end cheek so as finally to lie externally alongside the coil 2. A groove 32 in the outer face of the end cheek 4 accommodates the inclined portion of the lead 28. To afford room for the rectifier 26 the bobbin 1 is eccentric with respect to its end cheeks 3 and 4.

By unsoldering the conductor 16 the end plate 7 can be removed to gain access to the contact units 5 without removing the complete relay module from a matrix assembly of a number of them. To facilitate such removal of the end plate it may be formed with edge recesses as indicated at 33 in order to clear the adjacent tag portions 17 of a neighbouring module in the matrix, the depth of these recesses being to this end commensurate with the overhang of the tag portions 17. In a similar manner, in order to facilitate removal of a complete module from the matrix, the end cheeks 3 and 4 may be formed with edge recesses on their edges which have the greater margin between them and the outside of the winding 2 because of the eccentricity of the winding. In the modified form of module illustrated by FIGS. 4 and 4a, such edge recesses are shown at 40 in FIG. 4.

Referring to these figures, the relay winding 2 again lies between end cheeks 3 and 4 having quadrantal corner projections 10 and 11 for the purpose already indicated. In this case a right angled notch 41 is formed at the inner edge of each of these projections and quadrantal notches 42 are formed at their outer corners, these notches facilitate the use of a tool for applying and removing the circular clip by which a "square" of four modules can be held together at their meeting corners. The end plate 7 fits against the outside of the end cheek 4 as before, being apertured at 43 to pass the terminal members 9 from the contact units 5, at 44 to pass the through terminal member 9′ and at 45 to pass the terminal connection 27 from a rectifier 26 when the latter is included in the module. The end plate 7, and likewise the end cheek 3, accommodate in slots 46 respective sets of end face conductors 16 having edge tag portions 17 as before, except that the tag portion 17′ adjacent the aperture 45 is formed with a notched connecting part 47 to which the rectifier connection 27 can be connected. The other terminal connection 28 from the rectifier 26 is bent so that its end portion passes through the aperture 44 alongside the terminal member 9′. The surface of the end cheek 4, and correspondingly the under surface of the end plate 7, are grooved to accommodate the crank portion 28′ of terminal member 28. These surfaces may also be grooved between the apertures 44 and 45 to accommodate a linking connection between the tag portion 17′ and the terminal member 9′, it being contemplated that this may be desirable in some uses of the module for which the rectifier 26 is not required. (It may be noted that in this case it is not possible to withdraw the rectifier 26 with the end plate 7; to remove the latter it would be necessary to unsolder not only the connections between the terminal members 9 and the tag connecting portions 21 but also the connections between the rectifier terminals 27 and 28 and the tag and terminal parts 17′ and 9′.) If in some circumstances connection is required between the terminal member 9 and a terminal member (9) of one of the contact units 5 this can be achieved by means of a connecting link such for instance as is shown at 50; this clip would, of course, be applied after application of the end plate 7.

In FIG. 4 a screening member 2′ is shown for the operating winding 2. In order to retain the end plate 7 in position prior to soldering of the projecting terminal members to the end-face conductors 16, the screening member 2′ may be provided with a lug 51 which can clip over the outer surface of the end plate, doing so beneath the bollard 49′ at the corresponding edge of the end plate.

In FIG. 5 an end plate 7′ carrying a modified form of end face conductor is illustrated. The tag portions 52 on these conductors, 16′, instead of being coplanar with the portions of the conductors accommodated in th end face slots, are bent at right angles to these portions so that the tag portions 52 present one of their major surfaces towards an adjacently mounted module. These tag portions 52 are bent so that towards their outer ends they stand somewhat proud of the edge of the end plate: consequently with two modules mounted side-by-side with their end face conductors in alignment, the adjacent tag portions of corresponding conductors will make butting connection rather than overlapping connection as before. Whether butting or overlapping, these connections will finally be established by soldering, for instance by a dip soldering operation which also establishes the other connections to conductors 16 from the components within the modules.

Also in FIG. 5 the end plate 7′ is further modified in that it is formed with integrally moulded barriers 53 between adjacent end face conductors. It has also been shown as having locating spigots 54 intended to mate with holes which would be provided for this purpose in the adjacent end cheek.

It will be appreciated that in all cases, instead of having the end face conductors carried by the end cheek (3) at one end it would be possible if so desired to provide a conductor-carrying end plate at both ends of the module.

What we claim is:

1. An electric circuit module comprising circuit elements having projecting terminal members, a modular support structure containing said elements within it and having an outer end face through which said terminal members project, said end face having a plurality of external slots extending across it transversely of the projecting terminal members, and a plurality of conductors, individual to the module, consisting of respective yoke portions accommodated in said slots and each extending therein from a position of connection with a projecting terminal member to edge positions adjacent opposite edges of the end face, tag portions extending outwardly from the plane of said end face and beyond said edges of the end face at the edge positions whereby they overhang said edges, and intermediate connection portions upstanding alongside the projecting terminal members at said positions of connection and connected thereto.

2. A module as claimed in claim 1 wherein said yoke portion of a conductor is of flat strip from lying edge onto the end face, and its slot has side wall portions which engage the sides of said yoke portion.

3. A module as claimed in claim 2 including tabs which extend from the portion which is alongside the terminal member and embrace the sides of that terminal member.

4. A module as claimed in claim 2 wherein the overhanging tag portions are each of flat strip form coplanar with the yoke portion and having an inclination thereto such that towards its free end it overhangs the edge of the end face.

5. A module as claimed in claim 2 wherein the tag portions extend substantially perpendicular to the end face and are of flat strip form facing in planes proud of the edges.

6. A module as claimed in claim 1 wherein said opposite edges have respective recessed portions on which said edge positions are situated.

7. A module as claimed in claim 1 wherein the yoke portions are retained in their slots by material integral with the end face and extending across the mouths of the slots.

8. A component module as claimed in claim 7, wherein the conductive members are stepped within the retaining material to prevent lengthwise movement of these members in their slots.

9. A module as claimed in claim 1, wherein said end face is formed at its other edges with upstanding bollards permitting anchoring of a connecting wire extending across the end face between these other edges.

References Cited
UNITED STATES PATENTS

| | | |
|---|---|---|
| 3,150,288 | 9/1964 | Flanders et al. _____ 317—101 |
| 3,227,927 | 1/1966 | Parstarfer _____ 317—101 |

ROBERT K. SCHAEFER, *Primary Examiner.*

J. R. SCOTT, *Assistant Examiner.*